United States Patent [19]
Schad

[11] Patent Number: 5,536,166
[45] Date of Patent: Jul. 16, 1996

[54] INJECTION MOLDING MACHINE WITH OPEN ACCESS TO THE MOLD AREA

[75] Inventor: Robert D. Schad, Toronto, Canada

[73] Assignee: Husky Injection Molding Systems Ltd., Canada

[21] Appl. No.: 386,701

[22] Filed: Feb. 10, 1995

[51] Int. Cl.[6] ................................................ B29C 45/66
[52] U.S. Cl. .................. 425/589; 425/451.6; 425/451.9; 425/593
[58] Field of Search .................................. 425/589, 590, 425/592, 593, 595, 450.1, 451, 451.2, 451.5, 451.6, 451.9

[56] References Cited

U.S. PATENT DOCUMENTS

| | | | |
|---|---|---|---|
| 4,222,731 | 9/1980 | Enrietti et al. | 425/451.5 |
| 4,389,183 | 6/1983 | Laurent et al. | 425/589 |
| 4,645,443 | 2/1987 | Aoki | 425/150 |
| 4,878,828 | 11/1989 | Wollschlager et al. | 425/589 |
| 4,938,682 | 7/1990 | Kadoriku et al. | 425/593 |
| 5,249,951 | 10/1993 | Leonhartsberger et al. | 425/589 |
| 5,297,952 | 3/1994 | Leonhartsberger | 425/593 |
| 5,332,385 | 7/1994 | Leonhartsberger | 425/589 |

FOREIGN PATENT DOCUMENTS 1109356  6/1961  Germany .
9417977  8/1994  WIPO .

*Primary Examiner*—Tim Heitbrink
*Attorney, Agent, or Firm*—Bachman & LaPointe

[57] ABSTRACT

An injection molding machine, comprising a frame including a first structural member having a stationary platen supporting a first mold half and a second structural member spaced from and connected with the first structural member; a movable platen supporting a second mold half wherein the movable platen is positioned between the first and second structural member and wherein the first mold half and the second mold half have a mold centerline; a device for moving the movable platen relative the stationary platen for closing the first mold half and the second mold half together, wherein the device for moving is connected with the frame; and a mechanism for adjustably spacing said first and second structural members along a first substantially common plane spaced from the mold centerline. Upon closing the first mold half and the second mold half together, the first structural member and the second structural member are caused to separate at least along the mold centerline. The mechanism for adjustably spacing causes a separation of the first structural member and the second structural member along the first substantially common plane which substantially prevents tipping of the platens and which substantially maintains parallelism between the stationary and movable platens and alignment of the mold halves.

18 Claims, 2 Drawing Sheets

INJECTION MOLDING MACHINE WITH OPEN ACCESS TO THE MOLD AREA

BACKGROUND OF THE INVENTION

This invention is directed to injection molding machines, and more particularly, to an injection molding machine having open access to the mold area on at least three sides and which includes a mechanism for correcting misalignment of mold platens caused from deformation of the molding machine frame during clamp-up.

Injection molding machines without tie bars on the top of the mold platen are preferable for they allow ease of access to the mold area. However, these machines typically cause clamping forces to be absorbed by the frame of the injection molding machine. The advantages of a machine not having tie bars is that the mold area defined by the mold halves remains substantially unobstructed and can be easily accessed for allowing easy mold installation, removal, or servicing. Accordingly, larger molds can be accommodated; more flexibility in implementing product handling devices is acquired; and easier part removal is achieved. The major flaw with injection molding machines having tie barless tops is that because the frame of the machine absorbs clamping forces, the frame is subject to deformation which leads to misalignment of the mold platens.

The several machines which follow have been designed for addressing the problem of frame deformation for top tie barless machines, however, none have been entirely successful.

European Patent Specification 0311133 represents one device employing articulation between the movable mold platen and the closing piston. The articulation compensates for any deformation in the machine frame but significantly increases the cost of the device. Additionally, such devices are particularly prone to fretting corrosion due to small movements and high loads in the articulated joint.

U.S. Pat. No. 4,222,731 to Enrietti et al. discloses a device having a longitudinal member pivotally connected to the central portion of two other members, wherein one end of each other member is connected to one of the platens. The opposite ends of the two other members are connected by a clamping cylinder piston. One of the two other members is divided into two portions, wherein the two portions have a releasably rigid connection therebetween. A separate piston cylinder is mounted to the machine frame for causing the moving platen to move between a mold open and a mold closed position. During the mold opening and closing strokes, the ends of the divided lever 22 swing back and forth past the member 20. Since the levers 22 are designed to withstand full mold clamping force, they must be sized accordingly, such that they are generally very large. Therefore, energy is wasted in moving the large mass of the levers 22 during each molding cycle.

Enrietti et al. also employs sliding connections between channel-shaped guides 24 of moving platen 6 to compensate for deformation. However, such sliding and/or pivoting connections are prone to wear and by definition, exert a high load over a small area resulting in concentrated loads. The stationary platen 2 is connected to one of the two members 16 and injection unit 10 moves back and forth once during each cycle with moving platen 6. This arrangement needlessly complicates the apparatus and is also a waste of energy, slowing the operating speed of the machine.

U.S. Pat. Nos. 5,249,951, 5,297,952 and 5,332,385 disclose several additional embodiments of a tie barless machine. All of the apparatuses disclosed incorporate means for resisting the clamping forces via the frame of the machine, exclusively. In each case, the machine frame deforms during the clamping step and therefore each machine employs one or more tilting platens to compensate for misalignment of the platens resulting from the deformation of the machine frame when the clamping force is applied.

U.S. Pat. No. 4,389,183 discloses an injection molding machine wherein the clamping forces are resisted by two hollow rectangular frames connected only by the stationary platen and a bed on the other end. There are no tie bars in this device but the rectangular frame still obstructs access to the area between the molds.

U.S. Pat. No. 4,645,443 discloses a means for adjusting shut height on an injection molding machine using a threaded nut supported on the back of the moving platen. When the nut is rotated it screws on the end of the clamping piston either towards or away from the moving platen. Since this adjustment mechanism is attached to the moving platen, it must shuttle back and forth with each machine cycle. This shuttling step requires additional energy and complexity to operate the device. Since the shut height is only adjusted when a machine is being set up to run a particular mold, this arrangement is a needless complication.

Accordingly, each of the devices discussed above include limitations to which the instant invention is directed to overcome. These limitations include deformation of the machine frame which results in misalignment of mold platens; complex compensation devices to correct the parallelism of the platens, requiring increased costs and additional space; substantial mass used to form the frame in order to minimize the deformation of the frame, increasing the costs and space consumption of the machine; wasted energy and decreased speed of machine operation due to the heavy weight of deformation resistant elements.

There exists a need, therefore, for an injection molding machine which allows for easy access to the mold area and which efficiently compensates for frame deformation during the clamp down process.

SUMMARY OF THE INVENTION

The primary object of this invention is to provide an injection molding machine with open access to the mold area and which efficiently compensates for frame deformation during clamp down of the mold halves.

Another object of this invention is to provide an injection molding machine having open access to the mold area which senses deformation of the frame and adjusts accordingly prior to structural damage.

Still another object of this invention is to provide an injection molding machine having a simple mechanism for maintaining platen orientation under clamp forces and substantially minimizing platen misalignment and tipping for maintaining a substantially parallel relationship therebetween.

Still another object of this invention is to provide an injection molding machine with open access to the mold area which avoids vertical forces when the desired clamp force is applied.

Yet another object of this invention is to provide an injection molding machine having a large range of shut height adjustments.

And still another object of the invention is to provide an injection molding machine having a reduced movable mass which is economical and allows for increased operating speed.

Further objects and advantages of the present invention will be apparent below.

The foregoing objects are attained by injection molding machine of the instant invention which comprises a frame including a first structural member including a stationary platen supporting a first mold half and a second structural member spaced from and connected with the first structural member; a movable platen supporting a second mold half wherein said first and second mold halves have a mold centerline wherein the movable platen is positioned between the first and second structural member; means for moving the movable platen relative the stationary platen for closing the first mold half and the second mold half; and means for adjustably spacing the first and second structural members along a first substantially common plane spaced from said mold centerline.

Upon applying clamping force when the first and the second mold halves are closed, the first structural member and the second structural member are caused to separate along at least the mold centerline. The means for adjustably spacing causes a separation of the first structural member and the second structural member along the first substantially common plane which substantially prevents tipping of the platens and which substantially maintains parallelism between the stationary and movable platens and alignment between the first mold half and the second mold half.

The details of the present invention are set out in the following description and drawings wherein like reference characters depict like elements.

DETAILED DESCRIPTION OF THE PREFERRED EMBODIMENTS

Figure 1:
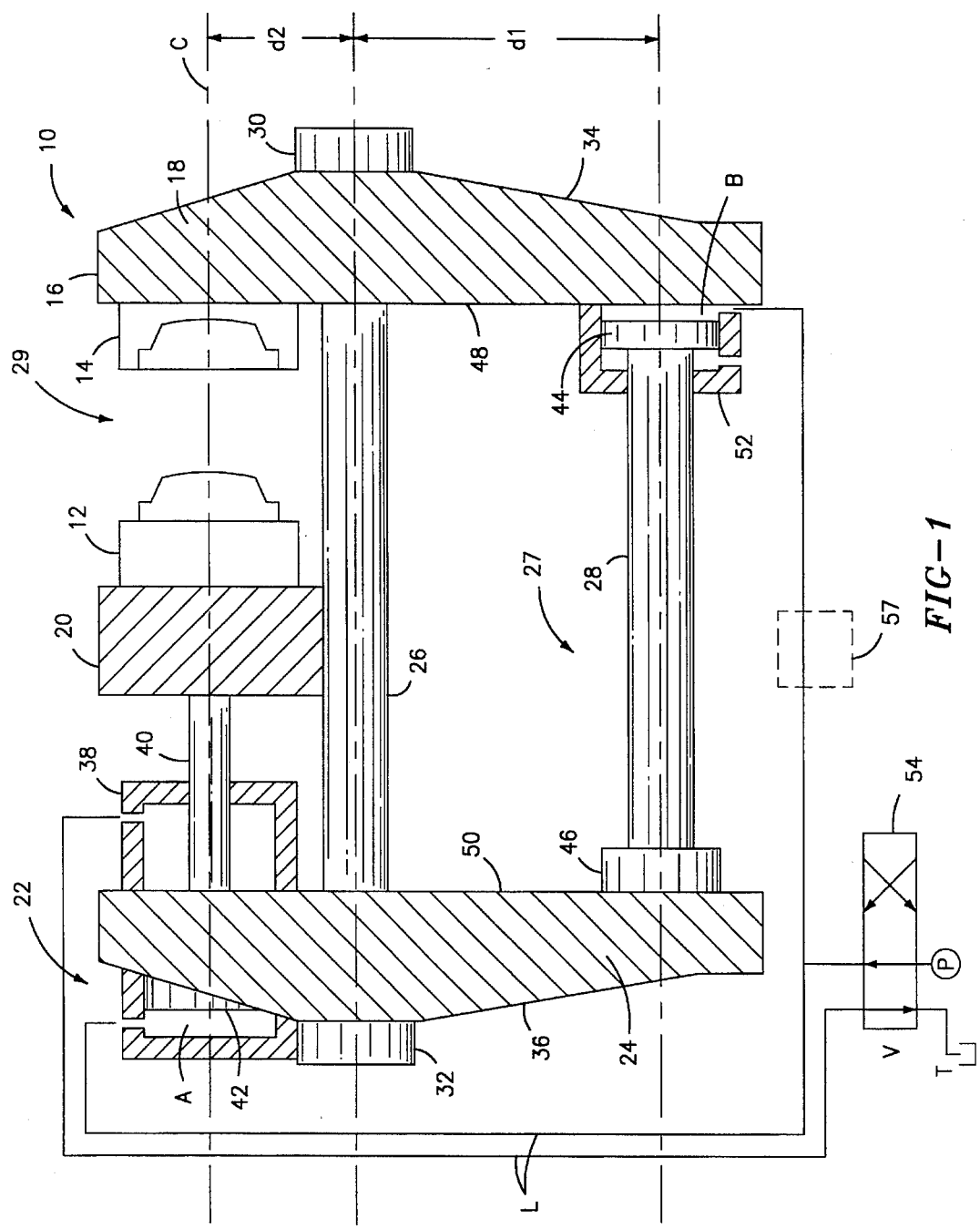
FIG. 1 is an elevational, cross-sectional, and partially schematic view of the injection molding machine of the present invention shown in the mold open position.

Referring now to the drawings in detail, there is shown in FIG. 1, the injection molding machine of the present invention, designated generally as 10. Machine 10 generally includes mold halves 12 and 14 having a mold centerline, stationary platen 16 comprising structural member 18, movable platen 20 adapted to be moved by piston system 22, structural member 24 connected with structural member 18 via tension member 26 and movable compression system 27 having a compression member 28. Two or more of elements 18, 24, 26, 28, 38, 52 could be combined into one or more one piece elements such as castings for example to reduce the number of individual components. As shown in FIG. 1, the injection molding machine 10 is preferably designed such that there is completely free access to the mold area 29 defined by mold halves 12 and 14 from at least three sides, i.e., the top, front, and back.

Structural members 18 and 24 having inner surfaces 48 and 50, respectively, and outer surface 34 and 36, respectively comprise the frame of machine 10 and can provide the structural support for machine 10 during the clamping operation of mold halves 12 and 14 via piston system 22 although other support means can be used. Structural members 18 and 24 are spaced apart and connected by tension member 26. Compression member 28, such as, for example in the form of a bar is located between structural members 18 and 24 and is connected at one end to either member 18 or member 24 along a first plane. At least one and preferably two tension members 26, extend between structural members 18 and 24 in an upper quadrant thereof in a second plane, wherein tension member 26 may be in the form of a bar having ends extending through the width of the structural members, as shown in FIG. 1. Tension member 26 can be fastened in any one of a number of conventional ways to structural members 18 and 24; i.e. bolted or welded to the inside of members 18 and/or 24, or members 18 and 24, and tension member 26 can be made as a one piece casting. Members 18 and/or 24 can also be pivotally attached to the tension member.

In the preferred embodiment of FIG. 1, tension member 26 includes fastening heads 30 and 32 positioned adjacent the outer surface of structural members 18 and 24, respectively. Heads 30 and 32 act as stops against structural members 18 and 24, respectively, for limiting outward movement. In the lower quadrant of structural members 18 and 24, compression system 27 spaces and connects the structural members in an adjustable manner along a common plane, wherein the movement of compression system 27 coincides with the pressure used in the clamping operation, as discussed below.

The clamping operation of mold halves 12 and 14 is preferably accomplished by a cylinder and piston system 22 which functions to move movable platen 20 and mold half 12 against mold half 14 and stationary platen 16. Piston and cylinder system 22 is preferably rigidly connected to structural member 24 such that upon the occurrence of the clamping operation, the force generated thereby is transmitted into structural members 22 and 24. Movable platen 20 is preferably guided on tension member 26 for clamping mold half 12 against mold half 14. Alternatively, platen 20 can be guided by another frame element, not shown. Piston cylinder system 22 includes a cylinder 38 having piston 40 and piston head 42 movable therein via the introduction of pressure into chamber A of cylinder 38. Accordingly, upon introduction of pressure from pressure source P into chamber A of cylinder 38, piston head 42 and piston 40 are caused to move through cylinder 38, moving movable platen 20 and mold half 12 against stationary platen 16 and mold half 14.

Upon the occurrence of the clamping operation between mold halves 12 and 14, a force is directed against the structural members 18 and 24, forcing the structural members against heads 30 and 32 of tension member 26, causing tension member 26 to elongate. Accordingly, a portion of the structural members is caused to move outwardly via a moment created on the upper portion of the structural members 18 and 24. Accordingly, to offset the moment caused by the clamping operation, the movable and adjustable compression system 27 is used to move the bottom portions of the structural members 18 and 24 outward an amount substantially equal to the sum of the elongation of tension member 26 plus the bending deformation of the structural members 18 and 24. The separation via compression system 27 causes a separation of the first structural member and the second structural member which compensates for the deformation of the frame and maintains a substantially vertical orientation of the platen preventing tipping of the platen, and which substantially maintains parallelism between the stationary and movable platens and alignment between the first mold half and the second mold half.

Compression system 27 extends between but not through structural members 18 and 24. Compression system 27 is preferably comprised of compression member 28 in the form of a bar having heads 44 and 46 at the ends thereof adapted to abut the inner surfaces 48 and 50, respectively, of structural members 18 and 24, respectively. Other shapes for compression member 28 may be used. Head 46 of member 28 could be integral with structural member 24 or structural member 18 if piston cylinder 52 is positioned on member 18, as it could be. As shown in FIG. 1, a cylinder 52 is preferably positioned adjacent structural member 18 and around head 44 at the end of compression member 28. Accordingly, upon introduction of pressure into chamber B of cylinder 52 and against head 44, compression member 28 is caused to push outwardly on structural member 24 relative to structural member 18.

Therefore, upon introduction of pressure into cylinder 38 of piston and cylinder system 22 for obtaining the clamping operation of mold halves 12 and 14, an amount of pressure is directed into cylinder 52 against head 44 of compression member 28 to completely compensate for the bending moment against structural member 24 on the upper portion thereof. Depending on the size of head 44 and cylinder 52 and the leverage advantages obtained by the structural design of the system, this amount of pressure may be equal to the pressure used in the clamping operation or preferably, less than the clamping pressure, in order to achieve the necessary compensation. If component size is a primary concern, head 44 can be smaller and depending again on leverage, a pressure greater than the clamping pressure can be used. Accordingly, tipping of and surface misalignment between mold halves 12 and 14 via the upper moment directed against structural member 24 is compensated for by compression member 28 correspondingly moving the bottom portion of structural member 24 outward. Since both structural members 18 and 24 can bend when clamping force is applied, the bottom portions of both structural members can be moved outwardly when the compression member is subjected to compensating forces.

In order to operate the injection molding machine 10 of FIG. 1, the shut height must be first adjusted by moving platen 20 toward platen 16 until mold halves 12 and 14 are within a few millimeters of touching. This position of the mold halves is stored in a controller (not shown) so that the platens will be moved to this position at high speed prior to final closing of the mold and application of the clamping force. Similarly, the mold open position can be set to provide just enough space between mold halves 12 and 14 to allow ejection and removal of a molded article.

During the molding operation, valve 54 is preferably designed to allow fluid under pressure to enter into chamber A against piston head 42 in cylinder 38 and in chamber B of cylinder 52 against piston head 44. This causes piston head 42, piston 40 and movable platen 20 along with mold half 12 to move to the right to close the mold. During mold closing, there is little resistance to platen movement, and therefore, there is preferably relatively little pressure resulting in little or no movement of piston head 44 of compression member 28 in cylindrical housing 52. Since there are such low pressures, there will also be very little deformation in the members comprising the machine. However, after mold halves 12 and 14 touch, pressure builds up equally in chambers A and B of cylinders 38 and 52, respectively, against piston heads 42 and 44, respectively, since these two chambers are in fluid communication along fluid lines L, wherein pressure is provided from pressure source P.

In the preferred embodiments, the areas of piston heads 42 and 44 are sized so that applying the same pressure to each piston head causes piston heads 42 and 44 to exert forces that will result in a balanced system. As pressure on piston heads 42 and 44 builds, tension member 26 elongates and structural members 18 and 24 bend. These deformations are compensated for by the movements of the piston head 44 in cylinder 52.

For the purpose of explaining the principle of the invention, if we assume that tension member 26 stretches and the other members do not deform, the distance between structural members 18 and 24 along compression member 28 and along mold center line C must increase by the same amount as the stretch of the tension member in order to keep the face of stationary platen 16 and the face of moving platen 20 in the desired parallel and in this case vertical orientation, avoiding tipping. As this stretch of tension member 26 occurs, enough fluid from pressure source P enters chamber A of cylinder 38 and chamber B of cylinder 52 to move piston heads 42 and 44, respectively, by an amount equal to the stretch of tension member 26 between structural members 18 and 24. This maintains the face of platen 16 substantially parallel and vertical with the face of moving platen 20 during initial clamp up and when full clamp force is applied. The system is self-adjusting since the proper force required to maintain balanced forces is determined by the geometry of the pistons. As noted above, in reality the other members deform also. This increases the total amount of compensation required by the system 27 to maintain the platens aligned and vertical. Accordingly, sufficient fluid is supplied to chamber A of cylinder 38 and chamber B of cylinder 52 to cause this movement to occur.

As an alternative, the surface areas of piston heads 42 and 44 could be sized so that applying equal pressure to them would result in unbalanced forces. However, the balancing of the forces is still required and could be controlled by substituting a pressure control valve for valve 54 or by inserting pressure control means 57 upstream of chambers A and B of cylinders 38 and 52, respectively. In this instance, the pressure against piston head 42 in the chamber A would need to be measured and used as the basis for determining the required pressure against differently sized piston head 44 in chamber B of cylinder 52 to produce the desired balanced forces. Such an arrangement would provide much more control and offer flexibility over the forces exerted by each piston head.

According to the above apparatus and operation thereof, since both piston heads 42 and 44 are free to float, compensation for the deformation of tension member 26 and structural members 18 and 24 is accomplished by movement of piston heads 42 and 44 relative to their respective cylinders 38 and 52. Forces are thereby transmitted through very rigid and robust elements resulting in a more reliable and sturdier apparatus.

Figure 2:
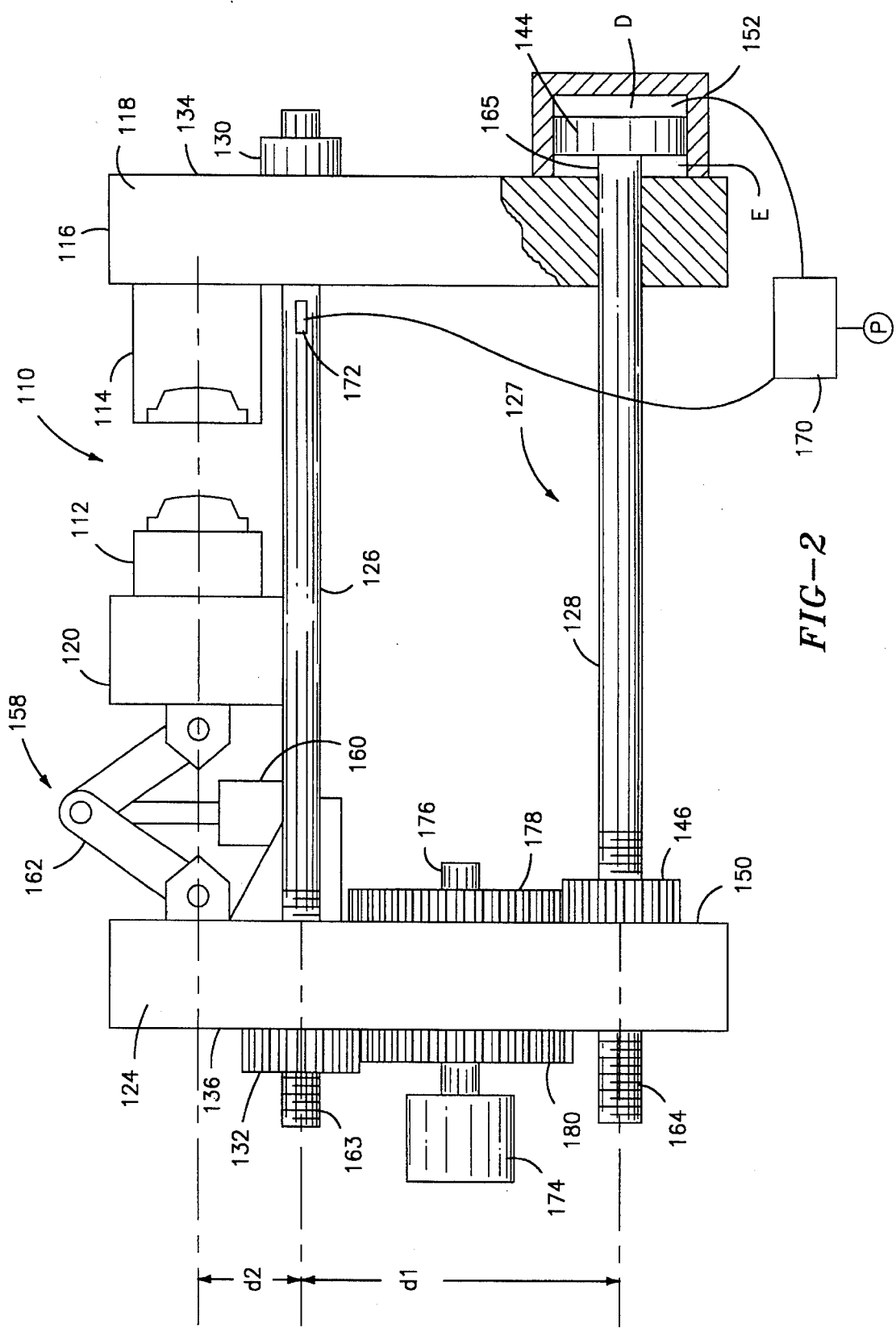
FIG. 2 is an elevational and partially schematic view of a second embodiment of the injection molding machine of the present invention in the mold open position.

Another embodiment of the injection molding machine is shown in FIG. 2, and designated generally as 110. For machine 110 a toggle mechanism 158 is preferably used for clamping the mold halves 112 and 114 as opposed to the piston cylinder system for the first embodiment. Because it is generally not possible when using only a toggle mechanism to adjust shut height by stopping a piston at a desired location, machine 110 is designed differently than the first embodiment. The mold halves 112 and 114, the stationary platen 116 and movable platen 120, and the structural members 118 and 124 are substantially the same as described above.

The toggle mechanism 158 includes a piston/cylinder mechanism 160 and is preferably supported by structural member 124 and movable platen 120. Alternatively, mechanism 160 could be a motor driven ball screw or other means known in the art for driving a toggle. Accordingly, the linkage of toggle mechanism 158 extends between and is pivotally connected to structural member 124 and movable platen 120 and includes a pivot point 162 between the other two pivot points. The piston cylinder mechanism 160 is preferably connected to the central pivotal point 162 of toggle mechanism 158 for actuating the mechanism and moving movable platen 120 with mold half 112 towards mold half 114. Accordingly, by movement of the piston cylinder mechanism in the upward and downward directions, mold halves 112 and 114 are moved into an open and closed position, respectively. Similar to as described above, movable platen 120 is preferably guidably supported on tension member 126. Piston cylinder mechanism 160 is also supported on structural member 124. As an alternative to the toggle 158, a conventional hydro-mechanical shutter style mechanism could be used to open and close the mold and provide the mechanical link between moving platen 120 and structural member 124. Any other mold opening and closing system could be used. Due to the need, as discussed above, for adjusting shut height differently with toggle mechanisms, tension member 126 and compression system 127 having compression member 128 are designed differently with respect to the first embodiment.

Tension member 126, which may be in the form of a bar, still extends between and connects structural members 118 and 124 and is adapted to be placed into tension during the clamping operations of mold halves 112 and 114. Tension member 126 extends through structural members 118 and 124 wherein the ends thereof extend outwardly beyond the outer surfaces 134 and 136 of structural members 118 and 124, respectively. Tension member 126 includes head 130 and nut 132 on each end, adjacent structural member 118 and 124, respectively. Head 130 is preferably rigidly attached to tension member 126. Nut 132 is preferably threadably secured onto a threaded portion 163 of tension member 126. Accordingly, the position of structural member 124 can be changed along tension member 126 by screwing nut 132 along the threaded portion 163 toward or away from structural member 118. The outer surface of nut 132 includes gear teeth for use in adjusting shut height, as discussed below.

Compression member 128 also extends through both structural members 118 and 124 wherein the end of compression member 128 extending through structural member 124 has a threaded portion 164. Compression member 128 includes nut 146 threaded on threaded portion 164 adjacent the inner surface 150 of structural member 124. The outer surface of nut 146 includes gear teeth for use in adjusting shut height, as discussed below. The end 165 of compression member 128 extending through and positioned outwardly of structural member 118 includes head 144 which is positioned in cylinder 152. Cylinder 152 includes a chamber D outwardly of piston head 144 and a chamber E inwardly of piston head 144. Chamber D is in fluid communication with a pressure source P controlled by controller 170. Controller 170 is electrically linked to a sensor 172 positioned on tension member 126 which indicates the application of a clamping force as measured by the separating force.

Accordingly, during the clamping operation of mold halves 112 and 114, tension member 126 is placed into tension causing it to elongate. Sensor 172 is operative to sense the elongation of tension member 126 and signal controller 170 for providing pressure to chamber D of cylinder 152 for moving the bottom portion of structural member 124 outwardly equal to the distance of the sum of the extension of tension member 126 and bending deformation of structural members 124 and 118. Therefore, the compression system 127 compensates for the elongation of tension member 126 and the potential moment placed on the upper portion of structural member 124 by moving the bottom portion of structural member 124 outwardly an equal amount.

In order to adjust the shut height of machine 110 prior to the clamping operations, motor 174 is provided having a shaft 176 extending through structural member 124. Shaft 176 includes gears 178 and 180 keyed thereon wherein gear 178 is positioned adjacent structural member 124 in the vicinity of inner surface 150 and gear 180 is positioned adjacent structural member 124 in the vicinity of outer surface 136. Gear 180 is adapted to engage the gear teeth of nut 132 and gear 178 is adapted to engage the gear teeth of nut 146. Accordingly, by turning shaft 176 and accordingly gears 180 and 178 via motor 174, nuts 132 and 146 are screwed along the threaded portions 163 and 164 of tension member 126 and compression member 128, respectively. This movement of nuts 132 and 146 allows for adjustment of shut height in this embodiment, as discussed below.

Shaft 176 causes gears 178 and 180 to turn since they are keyed thereto. Gear 178 turns nut 146 and gear 180 turns nut 132. The threaded portions 163 and 164 are designed such that when motor 174 is turning in one direction, tension and compression nuts 132 and 146, respectively, move along the tension and compression members in unison either toward the left or toward the right. Reversing the motor 174 causes all the heads to move along the tension and compression members in the opposite direction in unison. The characteristics of gears 178 and 180, the gear teeth on nuts 146 and 132 and the pitch of the threads on each of the threaded portions 163 and 164 of the tension and compression members, respectively, are selected such that one turn of shaft 176 results in nuts 146 and 132 travelling the same distance along tension and compression members 126 and 128, respectively. The direct meshing of the gears and nuts could obviously be replaced by synchronous belt running over spaced apart gears.

In operating machine 110 of FIG. 2, the shut height is preferably first set by opening the shut height larger than the shut height of the mold. The shut height is adjusted by motor 174 turning shaft 176 in one direction.

In adjusting shut height, toggle mechanism 158 is extended into the mold closed and clamped position by piston cylinder mechanism 160, and motor 174 is turned to cause nuts 146 and 132 to move to the right, i.e., toward stationary platen 116. When the desired position is reached, motor 174 is stopped. Toggle mechanism 158 can now open and close the mold halves 112 and 114 to a desired position due to its mechanical reliability. The shut height is then reduced further so that toggle mechanism 158 will create the desired clamp up force when fully extended and locked over center as is known in the art. Nut 146 prevents compression member 128 from passing through structural member 124. Nut 146 pushes against structural member 124 and to the left, in the area in which compression member 128 extends through structural member 124. Structural member 124 is restricted from moving to the left in the region of tension member 126 by nut 132 which is engaged with thread portion 163 of tension member 126. Tension member 126 is prevented from moving to the left by head 130 pushing against outer surface 134 of structural member 118.

As toggle mechanism 158 applies a force to the closed mold halves 112 and 114, tension member 126 begins to elongate. This elongation or deformation is sensed by sensor 172 which sends a signal to controller 170. Sensor 127 could be located anywhere on the machine where forces caused by clamp up can be measured, i.e. anywhere along the mold centerline. Controller 170 causes pressure source P to provide enough hydraulic fluid under pressure in chamber D to balance the force being exerted by toggle mechanism 158.

In both of the embodiments described above, distance d1, the distance of the center line of the compression member from the center line of the tension member is preferably greater than distance d2, the distance of the center line of the mold halves 12 and 14 from the center line of the tension member. Accordingly, leverage action is provided which magnifies the force exerted by piston cylinders 52 or 152 by factor of d1/d2. The leverage allows for operation with either lower hydraulic pressure in cylinders 52 and 152 or the use of smaller cylinders. Such lower pressure minimizes leaks and such smaller components are more economical.

Another variation of the shut height adjustment mechanism for FIG. 2 would be to include the driven geared head arrangement of FIG. 2 with a conventional hydromechanical clamp in place of the hydraulic clamp of FIG. 1. Columns could be located on the back of moving platen 120, with a shutter (not shown) on a very short stroke/high force clamping cylinder/piston (not shown) mounted on structural member 124 to be used to apply to the clamp force. An additional small bore long stroke cylinder (not shown) could be used to open and close the mold by moving the moving platen. This version would operate exactly as described for the embodiment shown in FIG. 1. Many conventional means to open, close and generate clamp force can be adapted to this invention including all electric, pneumatic, numerous toggle designs, etc.

With respect to the deformations caused during the clamping process of the mold shown herein and in the prior art, it is clear that the deformations as a result are very small, generally in the order of 1 to 2 millimeters. However, although they are small, the deformations cause problems in supporting, guiding and aligning the mold halves on the moving platen with that on the stationary platen. The prior art devices result in a vertical component of force acting through the mold halves since they allow the stationary platen to tip away from the vertical. Such an effect tends to lift the moving platen from the horizontal center line, requiring complicated means to compensate for the deformation of the frame of the machine. Accordingly, the device described hereinabove is operative to correct these problems with the prior art, having the advantages described below.

The primary advantage of this invention is that an injection molding machine is provided with open access to the mold end and which efficiently compensates for frame deformation during clamp down of the mold halves, minimizing stationary platen tipping. Another advantage of this invention is that an injection molding machine is provided having open access to the mold area which senses deformation of the frame and adjusts the device accordingly prior to structural damage. Still another advantage of this invention is that an injection molding machine is provided having a simple mechanism for preventing platen misalignment for maintaining a parallel relationship therebetween. Still another advantage of this invention is that an injection molding machine is provided with open access to the mold area which avoids vertical forces when the desired clamp force is applied. Yet another advantage of this invention is that an injection molding machine is provided having a large range of shut height adjustments. And still another advantage of the invention is that an injection molding machine is provided having a reduced moving mass which is more economical, allowing for higher operating speeds.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding machine, comprising:

a frame including a first structural member having a stationary platen supporting a first mold half and a second structural member spaced from and connected with said first structural member;

a movable platen supporting a second mold half wherein said first mold half and said second mold half have a mold centerline and wherein said movable platen is positioned between said first and said second structural member;

means for moving said movable platen relative the stationary platen for closing said first mold half and said second mold half, said means for moving connected with said frame;

means for adjustably spacing said first and second structural members along a first substantially common plane, wherein said first substantially common plane is spaced from said mold centerline;

further including means for sensing a separating force applied between said first structural member and said second structural member along said mold centerline upon clamping of said first mold half and said second mold half, wherein said means for sensing is connected in communication with said means for adjustably spacing for signaling said means for adjustably spacing to cause said separation; and wherein upon applying a clamping force to said first mold half and said second mold half, said means for adjustably spacing causes a separation of said first structural member and said second structural member along said first substantially common plane which substantially prevents tipping of said platens and maintains parallelism between said stationary and movable platen and alignment between said first mold half and said second mold half.

2. The injection molding machine according to claim 1, further comprising at least one tension member extending between and connected with said first and second structural member along a second substantially common plane, wherein upon closing said first and said second mold halves, said second structural member is forced away from said first structural member and said tension member is subject to elongation.

3. The injection molding machine according to claim 1, further comprising a tension member extending between said first and said second structural members and subject to elongation upon the clamping of said mold halves, wherein said means for sensing comprises a sensor attached to said tension member which senses said elongation of said tension member.

4. The injection molding machine according to 1, wherein said means for adjustably spacing comprises at least one compression member substantially movable via pressure directed thereagainst from a pressure source, wherein said pressure source is controllably connected with said means for sensing such that pressure is directed against said compression member for moving at least one of said first and said second structural members outward and preventing tipping of said platens and maintaining said platens substantially parallel when said means for sensing senses said clamping force.

5. The injection molding machine according to claim 1, further including at least one tension member extending between and connecting said first and second structural members along a second substantially common plane spaced from said first substantially common plane and said mold centerline, wherein said means for adjustably spacing comprises at least one compression member substantially movable against at least one of said first and said second structural members.

6. The injection molding machine according to claim 5, wherein each of said means for moving and said compression member are movable via the direction of pressure thereagainst, wherein upon the direction of pressure into said means for moving, said tension member is caused to elongate and an amount of pressure is directed against said compression member for displacing said compression member a distance substantially equal to the sum of the elongation of said tension member and the bending deformation of at least one of said first and second structural members.

7. The injection molding machine according to claim 6, wherein said means for moving and said compression member share a common pressure source.

8. The injection molding machine according to claim 6, wherein said tension member and said compression member each have a centerline, wherein said tension member is positioned between said compression member and said mold centerline such that the distance between the centerline of the compression member and the centerline of the tension member is greater than the distance between the centerline of the tension member and the mold centerline.

9. The injection molding machine according to claim 1, wherein said means for adjustably spacing comprises at least one compression member positioned along said first substantially common plane and at least one tension member positioned along a second substantially common plane, wherein each of said tension and compression members extend between and are connected with said first and second structural members, and wherein shut height is adjustable via the movement of said second structural member on said tension and compression members relative said first structural member.

10. The injection molding machine according to claim 1, wherein said first mold half and said second mold half define a mold area which is substantially unobstructed for access thereto from at least three sides.

11. The injection molding machine according to claim 10, wherein said three sides include a top side, a front side, and a back side.

12. The injection molding machine according to claim 1, wherein said means for moving comprises a piston and cylinder assembly.

13. The injection molding machine according to claim 1, wherein said means for moving comprises a toggle and piston assembly.

14. The injection molding machine according to claim 1, wherein upon applying said clamping force, deformation of said first and said second structural members occurs, said means for adjustably spacing further for compensating for said deformation through said separation of said first and said second structural members.

15. The injection molding machine according to claim 1 wherein said means for adjustably spacing causing said separation is further for maintaining a substantially vertical orientation of said platens.

16. An injection molding machine, comprising:

a frame including a first structural member having a stationary platen supporting a first mold half and a second structural member spaced from and connected with said first structural member;

a movable platen supporting a second mold half wherein said first mold half and said second mold half have a mold centerline and wherein said movable platen is positioned between said first and said second structural member;

means for moving said movable platen relative the stationary platen for closing said first mold half and said second mold half, said means for moving connected with said frame; and means for adjustably spacing said first and second structural members along a first substantially common plane, wherein said first substantially common plane is spaced from said mold centerline;

wherein upon applying a clamping force to said first mold half and said second mold half, said means for adjustably spacing causes a separation of said first structural member and said second structural member along said first substantially common plane which substantially prevents tipping of said platens and maintains parallelism between said stationary and movable platen and alignment between said first mold half and said second mold half;

further including at least one tension member extending between and connecting said first and second structural members along a second substantially common plane spaced from said first substantially common plane and said mold centerline, wherein said means for adjustably spacing comprises at least one compression member substantially movable against at least one of said first and said second structural members;

wherein each of said means for moving and said compression member are movable via the direction of pressure thereagainst, wherein upon the direction of pressure into said means for moving, said tension member is caused to elongate and an amount of pressure is directed against said compression member for displacing said compression member a distance substantially equal to the sum of the elongation of said tension member and the bending deformation of at least one of said first and second structural members;

wherein said tension member and said compression member each have a centerline, wherein said tension member is positioned between said compression member and said mold centerline such that the distance between the centerline of the compression member and the centerline of the tension member is greater than the distance between the centerline of the tension member and the mold centerline; and wherein said compression member includes a piston head adapted to receive pressure thereagainst, said piston head having a particular size, wherein said size of said piston head and said distance between the centerline of said compression member and the centerline of said tension member are operative to allow the pressure directed against said piston head to equal said pressure directed against said means for moving while displacing said compression member and at least one of said first and said second structural members along said first substantially common plane a distance substantially equal to the sum of at least the elongation of said tension member and the deformation of said frame.

17. An injection molding machine, comprising:

a frame including a first structural member having a stationary platen supporting a first mold half and a second structural member spaced from and connected with said first structural member;

a movable platen supporting a second mold half wherein said first mold half and said second mold half have a mold centerline and wherein said movable platen is positioned between said first and said second structural member;

means for moving said movable platen relative the stationary platen for closing said first mold half and said second mold half, said means for moving connected with said frame; and means for adjustably spacing said first and second structural members along a first substantially common plane, wherein said first substantially common plane is spaced from said mold centerline;

wherein upon applying a clamping force to said first mold half and said second mold half, said means for adjustably spacing causes a separation of said first structural member and said second structural member along said first substantially common plane which substantially prevents tipping of said platens and maintains parallelism between said stationary and movable platen and alignment between said first mold half and said second mold half;

further including at least one tension member extending between and connecting said first and second structural members along a second substantially common plane spaced from said first substantially common plane and said mold centerline, wherein said means for adjustably spacing comprises at least one compression member substantially movable against at least one of said first and said second structural members; and wherein said compression member includes one end having a piston head positioned in a cylinder, said piston head adapted to receive pressure thereagainst for displacing said compression member.

18. An injection molding machine, comprising:

a frame including a first structural member having a stationary platen supporting a first mold half and a second structural member spaced from and connected with said first structural member;

a movable platen supporting a second mold half wherein said first mold half and said second mold half have a mold centerline and wherein said movable platen is positioned between said first and said second structural member;

means for moving said movable platen relative the stationary platen for closing said first mold half and said second mold half, said means for moving connected with said frame; and means for adjustably spacing said first and second structural members along a first substantially common plane, wherein said first substantially common plane is spaced from said mold centerline;

wherein upon applying a clamping force to said first mold half and said second mold half, said means for adjustably spacing causes a separation of said first structural member and said second structural member along said first substantially common plane which substantially prevents tipping of said platens and maintains parallelism between said stationary and movable platen and alignment between said first mold half and said second mold half;

wherein said means for adjustably spacing comprises at least one compression member positioned along said first substantially common plane and at least one tension member positioned along a second substantially common plane, wherein each of said tension and compression members extend between and are connected with said first and second structural members, and wherein shut height is adjustable via the movement of said second structural member on said tension and compression members relative said first structural member; and wherein said second structural member is movable via drivable gears threadably connected with threaded portions of said tension and compression members adjacent said second structural member, wherein as said gears are driven along said members, said second structural member is caused to move along said members relative said first structural member.

* * * * *